United States Patent [19]

Berger et al.

[11] Patent Number: 5,418,906
[45] Date of Patent: May 23, 1995

[54] METHOD FOR GEO-REGISTRATION OF IMPORTED BIT-MAPPED SPATIAL DATA

[75] Inventors: Blaine H. Berger, Longmont; Mark S. Kressin, Niwot; Bret P. Smith, Longmont, all of Colo.

[73] Assignee: International Business Machines Corp., Armonk, N.Y.

[21] Appl. No.: 32,211

[22] Filed: Mar. 17, 1993

[51] Int. Cl.⁶ .............................................. G06F 15/62
[52] U.S. Cl. .................................................. 395/161
[58] Field of Search ............... 395/155, 156, 157, 158, 395/161; 364/443, 444, 459; 345/113, 114

[56] References Cited

U.S. PATENT DOCUMENTS

| | | | |
|---|---|---|---|
| 4,737,916 | 4/1988 | Ogawa et al. | 369/443 |
| 4,791,572 | 12/1988 | Green, III et al. | 364/449 |
| 4,821,214 | 4/1989 | Sederberg | 369/522 |
| 5,312,478 | 5/1994 | Reed et al. | 395/148 |
| 5,313,574 | 5/1994 | Beethe | 395/159 |

OTHER PUBLICATIONS

"Remote Sensing & Image Interpretation", Lillesand, John Wiley & Sons, Inc. pp. (612–625).
"Geographic Information Systems: An Introduction" Star, Printice Hall, Inc; pp. 1–31 (1990).

*Primary Examiner*—Phu K. Nguyen
*Attorney, Agent, or Firm*—D. A. Mims

[57] ABSTRACT

A method which allows the user to convert several data layers from one GIS into another. The user creates a template map of the area of interest. The template is an "all points" map which, when graphed, would appear as a black polygon identical in shape to the area of interest. Using the first GIS, the template is converted to a file in bit-mapped format. All zero bits in this file are identified and their position in the file noted. This information is referred to as the transform function. For each data layer to be converted, the first GIS is used to display a map of the proper extent. This display is converted to a file in bit-mapped format and the transform function used to delete non-data bits which correspond to the zero bits identified in the template file. The resulting, modified, bit-map is imported into the second GIS.

10 Claims, 3 Drawing Sheets

FIG. 2A
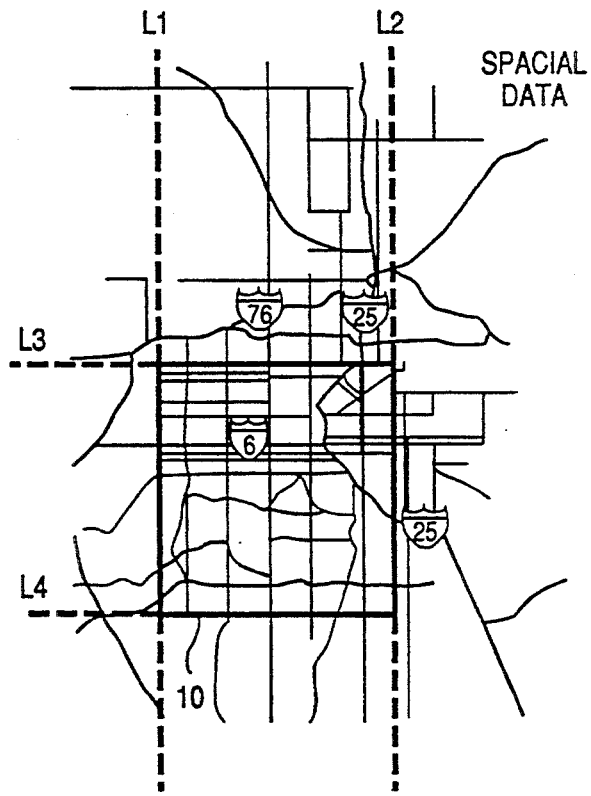
FIG. 2B
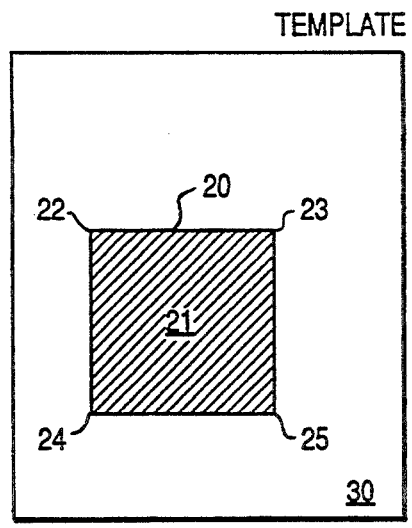
FIG. 2C
```
000000000000000000000000000000000000  BIT-MAP
000000000000000000000000000000000000
000000000000000000000000000000000000
000000001111111111111110000000000000
000000001111111111111110000000000000
000000001111111111111110000000000000      50
000000001111111111111110000000000000
000000001111111111111110000000000000
000000001111111111111110000000000000
000000001111111111111110000000000000
000000001111111111111110000000000000
000000000000000000000000000000000000
000000000000000000000000000000000000
000000000000000000000000000000000000
```

FIG. 3A
```
        Read Template Map File
        Determine number of rows (NROWS)
        Determine number of columns (NCOLS)
        Zero variables R1, R2, C1, C2
        Set Boolean flag R_FLAG TO FALSE
    310 For (row=0; row < NROWS; row ++)
            Read one row of data
            If R_FLAG = FALSE and entire row is zero then R1=row
                Else R_FLAG = TRUE
            If R_FLAG = TRUE and entire row is zero then
              DO
                R2 = row
                row = NROWS
              END
        END
    350 Read one row of data at row = R1
        Set Boolean flag C_FLAG to FALSE
        For (column = 0; col < NCOLS; column++)
            If C_FLAG = FALSE and column is zero then C1 = column
                Else C_FLAG = TRUE
            If C_FLAG = TRUE and column is zero then
              DO
                C2 = column
                column = NCOLS
              END
        END
```

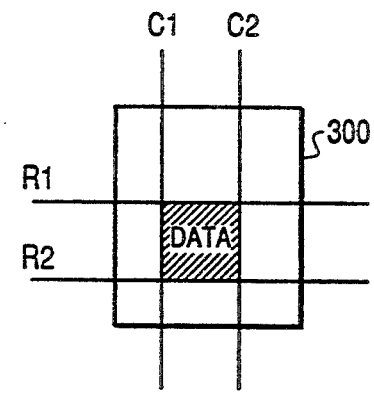

FIG. 3B

METHOD FOR GEO-REGISTRATION OF IMPORTED BIT-MAPPED SPATIAL DATA

FIELD OF INVENTION

The present invention relates to computer aided geographic information systems (GIS). More particularly, this invention relates to an improved method of converting data from one GIS to another, maintaining a consistent system of georeferencing.

BACKGROUND OF THE INVENTION

A geographic information system is an information system designed to work with data referenced by spatial or geographic coordinates. For example, on a very basic level, a contour map of an area of land (that is, a map in which contour lines indicate the elevations at specific geographic points) could be considered a GIS. If, to the contour map, we added a street map, a sewer map, and an aerial photograph, then we would have a GIS composed of four data sets: each set being referred to as a data layer or data plane.

In an automated GIS, the data layers will be stored in a data base system and a set of tools will be included to enter, manipulate and analyze the data, and then display the result either on a screen or as hardcopy printout.

To create an automated GIS, it is necessary to first identify and gather data. Typical sources of such data are municipal maps, government survey maps, aerial photographs and other publicly available data sources. The data must be extracted from these sources and then be manipulated so that it may be entered into the GIS. In addition, the data must be georegistered or georeferenced. That is, the spatial data must be referenced to a coordinate system such as Universal Transverse Mercator, State Plane, or Latitude/Longitude.

The geo-registration process is mathematically as follows:

$$x = f_1(X,Y)$$

$$y = f_2(X,Y)$$

where
- (x,y) = distorted coordinates in some coordinate system,
- (X,Y) = correct coordinates in a selected reference grid
- $f_1$, $f_2$ = transformation functions In its simplest form, where the distorted coordinates are taken from a scale drawing and the selected reference grid is a flat surface marked by latitude and longitude, the transformation functions are linear equations of the type: $x = AX + BY + C$, where A, B and C are constants. In the case of aerial photographs, where the intent is to represent the curved earth surface on a flat map, and where the angle of the photograph, as well as the photographs representation of a curved surface in a two dimensional plane must be taken into account, the transformations are considerably more complex but are well known in the art.

The standard method by which data is georegistered against selected reference coordinates (i.e. of identifying the required transformation functions) can be described as follows:

1. select a point from the spatial data available (distorted coordinate system) and determine the equivalent point in the selected reference grid;
2. express both selected points in terms of pairs of coordinates and compute the transformation function which reflects the relationship between the pairs;
3. choose another point and repeat steps 1 and 2.

Repeating the process for all points in the spatial data set would be prohibitively costly in both time and effort. Accordingly, the process is repeated only for a selected sample of points. The method by which the points are chosen (the sampling methodology) can be taken from a variety of well-known techniques such as nearest neighbor, bilinear, or cubic convolution.

It is not uncommon for the "true" transformation function to vary over the area of interest. For example, in an aerial photograph, the curvature of the earth results in a different mapping of points to the two dimensional picture. Accordingly, the "true" transformation function varies depending on the distance from the observation point to the pictured surface. As another example, consider a diagram of water mains. If the purpose of the diagram was to indicate the points of interconnection, then the representation of the mains between such interconnection points would not necessarily be consistant in the sense that there would likely not be a constant ratio of mapped lines to the physical distance between points. The "true" transformation function to georeference such a diagram would consist of a collection of linear functions, none of which were necessarily related to any other.

Where the "true" transformation varies over different parts of a map, the transformation calculated from only a subset of points may have certain inaccuracies. This will result in distortions when the calculated transformation function is used to georeference the entire set of spacial data points.

Various schemes for automating the process of georeferencing exist in the art. Most of the techniques focus on reducing the distortion by choosing a large number of coordinate pairs (i.e. rubber-sheeting techniques.) The current state of the art is described in the book *Remote Sensing and Image Interpretation*, Lillesand and Kiefer, Second edition, 1987, Chapter 10, Section 10.2.

Often GIS users require information embodied in data in more than one GIS. Since each GIS typically keeps its data in a proprietary format, there are very few commercially available conversion programs which allow a user to import data from one or more source GISs to a single target GIS.

In the prior art, conversion from one GIS to another was done by taking the physical output of each of the required data layers that resided in one GIS and mapping that output onto the second GIS. To describe this process more specifically, the following notation will be used: Data Layer (a,b) will refer to a bth layer of GISa. Accordingly, assume that a user wishes to use Data Layer (1,1), Data Layer (1,2), and Data Layer (1,3), all of which are found in GIS1, together with Data Layer (2,1) which is found in GIS2. Further assume that GIS2 contains a particularly useful data manipulation tool so that it is mandatory that the GIS1 Data Layers (1,n) be converted to GIS2, rather than the more simple step of converting Data Layer (2,1) to GIS1 format.

In this situation, the user would take the spatial information of Data Layer (1,1) (typically by using the tools of GIS1 to create a graphic output such as a physical map) and georegistering this information against Data Layer (2,1), using the same techniques that would have been used had Data Layer (1,1) and Data Layer (2,1) been a surveyor map and a desired coordinate system, respectively. (In other words, using the techniques described in the preceding paragraphs.) This process would be repeated for Data Layer (1,2) and Data Layer (1,3).

Since each of the Data Layers (1,n) contained different data, (different points and lines would be represented on the map associated with each Layer), the set of points the user selected from Data Layer (1,1) to register against points from Data Layer (2,1) would necessarily be different from the set chosen from Data Layer (1,2) to be registered against Data Layer (2,1). This means that the time-consuming process of repeatedly choosing different coordinate pairs must be executed for each layer. Further, as previously discussed, the choice of a particular subset of coordinate pairs can introduce certain distortions in the georegistration. Since the sets of coordinates were different for each Data Layer (1,n), the distortions in the georegistration would be different for each layer. This result is that the imported Layers would be registered imperfectly and would not overlay properly.

OBJECTIVES OF THE INVENTION

Accordingly, it is an objective of the invention to provide a means of converting spatial data from one GIS to another GIS so that the registration between the layers of the first GIS is not lost and the problem of improper overlay is minimized.

It is a further objective of the invention to provide a method of converting multiple layers of spatial data from one geographic information system to another whereby the problem of determining multiple transformation functions is avoided, thus providing consistent distortions in the transformed layers, said consistent distortions being more easily compensated for.

These and other objects, features and advantages of the invention are achieved by the technique described herein.

SUMMARY OF THE INVENTION

The invention is comprised of a method which allows the user to convert several data layers from one GIS into another. The user creates a template map of the area of interest. The template is an "all points" map which, when graphed, would appear as a black polygon identical in shape to the area of interest. Using the first GIS, the template is converted to a file in bit-mapped format. All zero bits in this file are identified and their position in the file noted. This information is referred to as the transform function. For each data layer to be converted, the first GIS is used to display a map of the proper extent. This display is converted to a file in bit-mapped format and the transform function is used to delete non-data bits which correspond to the zero bits identified in the template file. The resulting, modified, bit-map is imported into the second GIS.

BRIEF DESCRIPTION OF THE DRAWINGS

FIGS. 2A, 2B and 2C represent a graphic representation of a selected geographic extent, the template for such extent, and the bit-map associated with such template, respectively.

FIGS. 3A and 3B show pseudo code used in creating the transformation function and the template from which the pseudo code was created, respectively.

DETAILED DESCRIPTION OF THE INVENTION

Figure 1:
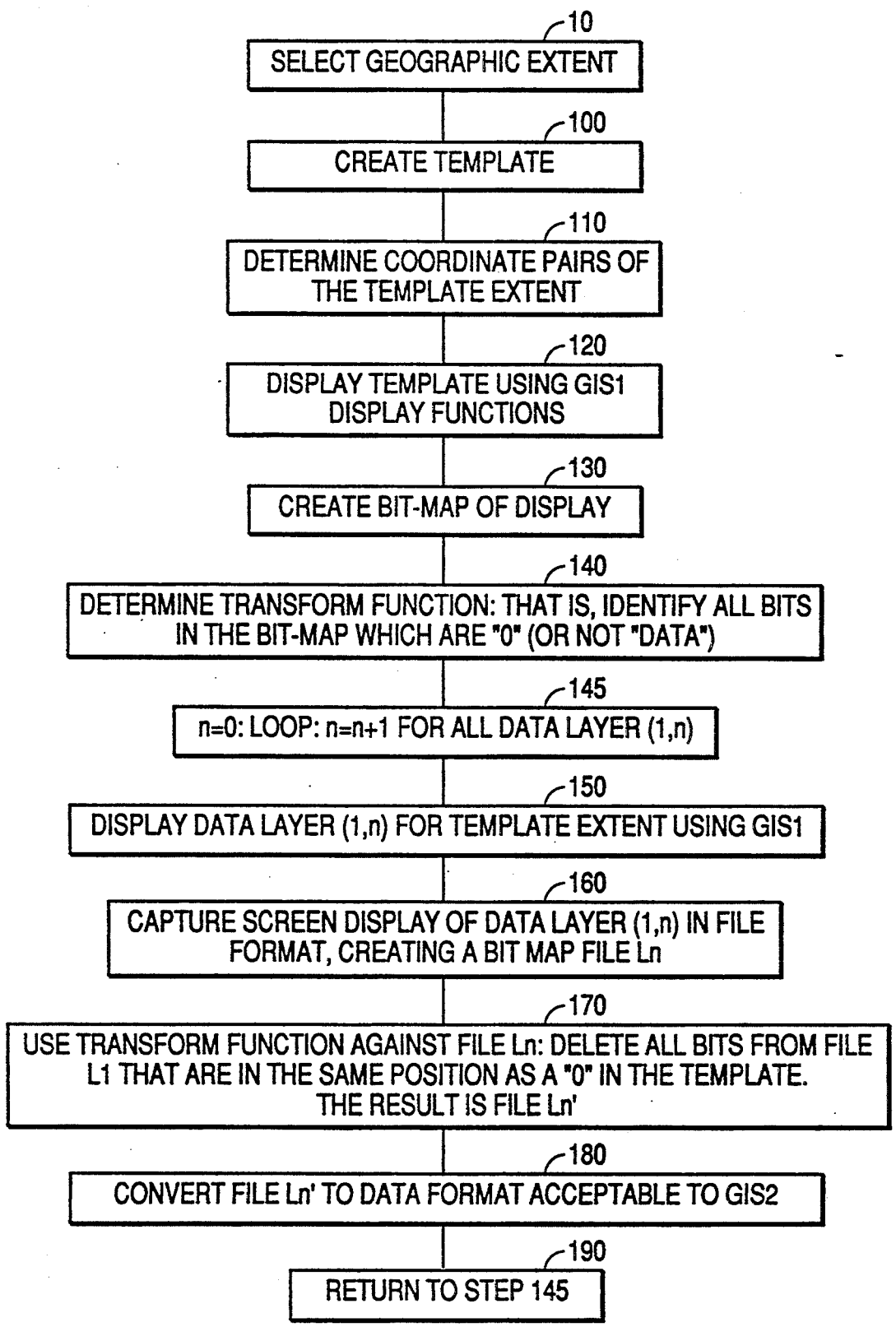
FIG. 1 is a flow diagram of the invention.

The invention described herein, namely, a method for georegistration of imported bit-mapped spatial data into a Geographic Information System (GIS), finds application in any computer-based GIS. In its preferred embodiment, the invention was executed on a host data processing system comprised of a workstation, an IBM RISC System/6000 Model 530 with 64 Megabytes of memory and a 1.6 Megabyte hard-drive, having connected to it a display screen IBM 6091-19 and keyboard and mouse. The RISC System/6000 used the AIX Version 3 operating system under which were executed two GIS software programs. Examples of such GIS programs are ARC/INFO TM, a program provided by ESRI (Environmental Systems Research Institute) and GRASS TM, a GIS program provided by United States Construction Engineering Research Laboratory.

The invention will be described with reference to the problem of taking information from GIS1 and mapping it into GIS2. In the preferred embodiment, the information consisted of that part of three data layers which was applicable to a fixed geographic area or extent. For example, the three data layers could be respectively land use, water, and a contour map, and the geographic extent or area could be a 20 block area of Denver, Colo.

FIG. 1 is a flow diagram of the invention. The steps herein described may be embodied in a program stored in the RISC System/6000 workstation.

The method of the invention begins with the selection of the geographic extent of interest, Step 10 of FIG. 1. In step 100, a template is created to correspond to this geographic extent. The template is a two-dimensional representation of the entire geographic extent of interest to the user. Thus, a template is a polygon whose shape is congruent to the area of interest. More specifically, both the geographic extent of interest and the template are areas bounded by line segments, each of which are connected to another at its end points. The length of the line segments of the geographic extent are in a constant ratio to the length of the corresponding line segments of the template and the angle between adjacent line segments is the same for both the geographic extent and the template. Referring to FIG. 2B, it will be seen that in the case under discussion, the template would be a rectangle (20), the length of whose sides bear a mathematical relationship to the distance of the area of Denver shown in FIG. 2A that is under analysis (10), that is, the area which extends from longitude L1 to L2 and latitude L3 to L4.

Further, the template is an "all points" template. That is, each point within the template is considered to be a data point, those points outside of the template area are not. Referring to FIG. 2B, it will be seen that the one embodiment under discussion, the template (20) created is a two dimensional mask, the interior (21) of which is black (represented by the shading in FIG. 2A), the exterior (30) of which is white. Thus, for this situation "data" is equivalent to "black" and "non data" to "white".

Step 110 is the determination of the coordinate pairs of the template extent, that is, the coordinate pairs of the end points of each of the line segments bounding the geographic extent. In the example under discussion, this would consist of four data points, corresponding to the four corners (22, 23, 24, 25) of the template. In FIG. 2A, the coordinate pairs in question would be (L1,L3), (L2,L3), (L1,L4) and (L2,L4) respectively.

Step 120 comprises displaying the Template by using the display functions of the GIS. Examples of such functions are the command "arcs" in ARC/INFO and "d.rast" in GRASS.

In Step 130, the information on the screen is captured in a file format. A number of techniques are available to execute this step. Many GISs provide a screen print option (since most users of a GIS require hard copy of the maps they create from the system). For example, in ARC/INFO, under Arcplot the use of the "screensave" option saves the current screen display as a raster image. There are other programs, unrelated to GIS, which allow the user to save the screen area in a file. For example, the X-Window Dump command "xwd" will save screen areas. The output of this step is what is referred to as a bit-map file, FILE T, which represents the template as displayed. As is known in the art, a bit map is a representation of characters or graphics by individual pixels or points of light, dark or color, arranged in row (horizontal) and column (vertical) order. Each pixel is represented by either one bit (simple black and white) or up to 32 bits (for high definition color). In the embodiment under discussion, black is represented by a "1" bit and white by "0". A representational picture of the bitmap for template (20) is shown in FIG. 2C, (50).

Step 140 is the identification in FILE T all bits in the bit-map which are not "1" (or "data"). In this step, all records which are not bit-map data, for example, header records or header fields, and all parts of records which are not bit-map data are identified. The location of each of the "0" s or non-bit-map data is thus identified.

FIG. 3A represents pseudo code for a program which isolates the data from non-data in a template (300), shown FIG. 3B. As can be seen from FIG. 3A, the code processes the bit-map first by row (310) and then by column (350).

The output of Step 140 is the transform information which will be saved and applied to all subsequent layers. The geographic template extent (in the example depicted in FIG. 2A, ((L1,L3), (L2,L3), (L1,L4) and (L2,L4)) will also be saved at this point.

Step 150 consists of using GIS1 to display a map which consists of Data Layer (1,1) information for the template extent.

Step 160 consists of creating a bit-map file, FILE L1, in the same way that FILE T was created from the Template in Step 130.

Step 170 consists of using the Transform Template against FILE L1. That is, the transform information is used to compress FILE L1 by dropping all the bits in the positions which correspond to the zero bits in Step 140. The output of this step is the transformed file, FILE L1'.

Step 180 consists of converting FILE L1' to ASCII data using programs such as GRASS's "r.in.ascii" command and the template extent identified in Step 110.

As can be seen from FIG. 2C, Step 190, Steps 150 through 180 are repeated for Data Layer (1,2) and data Layer (1,3), creating files File L2' and File L3'. All three transformed files (in this example, FILE L1', FILE L2' and FILE L3') are imported to GIS2.

As will be clear to those skilled in the art, an important step in the invention and improvement over the prior art is the step of recognizing that a template map can be created and exploited for all succeeding coverages or layers to be transferred. Since the transform function is created only once, for all points, by creating the function for the template map and then applying that function to all subsequent map layers, all subsequent map layers can be imported without re-selecting coordinate pairs, or recomputing transformation functions. This results in perfectly co-registered map layers in the second GIS, as well as correct geo-registration to a coordinate system. In addition, if a distortion is introduced in the creation of the transformation function, the distortion is carried systematically throughout each of the data layer transforms. Systematic errors to those skilled in the art can either be easily corrected or, for some applications, even ignored.

As discussed, FIG. 3A is an example of a portion of the instructions which can provide the function corresponding to Step 140 of FIG. 1, namely, to convert the bit-map of the template to a transform function. For the embodiment under discussion, a program with the function of the pseudo code shown in FIG. 3A was written in the C programming language as described in the publication *the C Programming Language* by Brian W. Kernighan and Dennis M. Ritchie, 1978, and also *X Window Systems Programming and Applications with Xt* by Douglas A. Young, 1989. Programs with this function can be written in any other conventional program language, as, for example, Fortran.

It is within the scope of the invention, that the order of the steps of the instructions in FIG. 3A can be altered, or other steps added, without changing the fundamental nature of the invention. It is similarly within the scope of the invention, that the order of the steps of FIG. 1 can be altered, or other steps added (as for example, providing for error routines), without changing the fundamental nature of the invention.

In as much as this invention outlines a method for geo-registering the bit-mapped display output of one GIS to be provided as input to another GIS, the technique described herein solves several important user requirements. For example, in the absence of a common data exchange format, this invention gives users of GIS products the ability to preserve a significant investment in their data (typically around 80% of total system implementation costs).

The invention has been described in reference to specific embodiments. Although a specific embodiment of the invention has been disclosed, it will be understood by those having skill in the art that other embodiments, variations and modifications to the herein described specific embodiment can be made without departing from the spirit and scope of the invention. For example, it will be clear to those skilled in the art that the invention may also be used to map one or more data layers from GIS1 and one or more data layers from GIS2 into GIS3. Accordingly, it is not intended that this invention should be limited except as indicated by the accompanying claims.

We claim:

1. In a graphic computer system including a display and a plurality of geographic information systems (GIS), each of said GIS containing a plurality of data layers, each data layer comprised of georeferenced data, a method for transferring georegistering data between said plurality of GIS while preserving georeferencing and maximizing accuracy, said method comprising the steps of:

a. selecting a geographic area, said area's boundary comprised of a plurality of line segments, each of said line segment being adjacent to two other of said line segments, and each line segment having two end points, each of said end point being shared with one of said adjacent line segments. Each of said geographic area end points having a coordinate pair, said coordinate pair identifying the geographic location of said end point;

b. creating a template, comprising a two-dimensional polygon whose boundary is comprised of a plurality of line segments, each of said line segment being adjacent to two other of said line segments, and each line segment having two end points, each of said end point being shared with one of said adjacent line segments; said template being congruent in shape and area to said geographic area and each of said template end points being associated with one of said geographic area end points;

c. determining for each of said template end points, the coordinate pair of said associated geographic area end point;

d. using a first GIS to display said template on said display screen, each interior point of said template on said display being of a first data type and each exterior point of said template being of a second data type;

e. creating from said template display a template file, said template file comprised of a plurality of bits, each of said bits identified with a specific point on said screen;

f. creating a transform function, said transform function consisting of identifying in said template file all bits which are of said second data type and recording the location of such bits in said file;

g. using said first GIS to displaying a portion of a first data layer from GIS1 on said display screen as a first map, said portion comprised of data georeferenced to said selected geographic area;

h. creating from said displayed first map a first file, said first file comprised of a plurality of bits, each of said bits identified with a specific point on said screen;

i. applying said transform function to said first file to create a first transformed file, said application comprised of identifying in said first file all bit positions corresponding to positions with 0 bits in said template file and deleting said identified bits;

j. converting said first transformed file to the input format of a second GIS;

k. using said first GIS to displaying a portion of a second data layer from said GIS1 on said display screen as a second map, said portion comprised of data georeferenced to said selected geographic area;

l. creating from said displayed second map a second file, said second file comprised of a plurality of bits, each of said bits identified with a specific point on said screen;

m. applying said transform function to said second file to create a second transformed file, said application comprised of identifying in said second file all bit positions corresponding to positions with 0 bits in said template file and deleting said identified bits; and n. converting said second transformed file to the input format of said second GIS.

2. A method as in claim 1 wherein, following step n of claim 1, said first transformed file is displayed overlaying said second transformed file are displayed using said second GIS.

3. A method as in claim 1 wherein said first data type is a "1"-bit and said second data type is a "0"-bit.

4. A method as in claim 1 wherein said coordinate pairs comprises the latitude and longitude of said end points.

5. A method as in claim 1 wherein said display on said screen is comprised of points of light, dark or color, said points being referred to as pixels, said points being arranged in rows and columns.

6. A method as in claim 5, wherein said first file created in step h is a bit-map, said bit map comprised of a collection of bits, each bit associated with one of said pixel of said display, said value of said bit determined by whether said pixel is a point of light, dark or color, and said position of said bit in said bit-map being determined by said row and column of said associated pixel.

7. A method as in claim 6, wherein said second file created in step l is a bit-map.

8. A method as in claim 7 wherein said second data layer is a data layer of a third GIS.

9. A method as in claim 6 wherein said second data layer is a data layer of a third GIS.

10. A method as in claim 1 wherein said second data layer is a data layer of a third GIS.

* * * * *